United States Patent [19]

Schrödter et al.

[11] 4,299,803
[45] Nov. 10, 1981

[54] PRODUCTION OF ALKALI METAL PHOSPHATE SOLUTIONS FREE FROM ZINC

[75] Inventors: Klaus Schrödter, Cologne; Klaus-Peter Ehlers, Erftstadt, both of Fed. Rep. of Germany; Roelof Mulder, s'Gravenpolder, Netherlands

[73] Assignee: Hoechst Aktiengesellschaft, Fed. Rep. of Germany

[21] Appl. No.: 104,570

[22] Filed: Dec. 17, 1979

[30] Foreign Application Priority Data

Dec. 23, 1978 [DE] Fed. Rep. of Germany ........ 2855922

[51] Int. Cl.$^3$ .............................................. C01B 25/30
[52] U.S. Cl. ................................... 423/308; 423/309; 423/312; 423/313
[58] Field of Search ................ 423/308, 309, 312, 313

[56] References Cited

U.S. PATENT DOCUMENTS

| | | | |
|---|---|---|---|
| 2,162,657 | 6/1939 | Wehrstein | 423/309 |
| 2,977,191 | 3/1961 | Pottiez | 423/315 |
| 3,305,305 | 2/1967 | Peterson et al. | 423/313 |
| 3,421,845 | 1/1969 | Peterson | 423/309 |
| 3,421,846 | 1/1969 | Miller | 423/309 |
| 4,134,962 | 1/1979 | Ehlers et al. | 423/313 |

*Primary Examiner*—O. R. Vertiz
*Assistant Examiner*—Wayne A. Langel
*Attorney, Agent, or Firm*—Connolly and Hutz

[57] ABSTRACT

The invention relates to the production of alkali metal phosphate solutions free of zinc, from phosphoric acid solutions contaminated with zinc. To this end, feed solution is admixed with alkali metal hydroxide or carbonate so as to establish in the resulting suspension a pH-value within the range 8 to 14. Next, resulting suspension is reacted under pressure and with thorough agitation with $H_2S$ or an alkali metal sulfide solution; and decontaminated alkali metal phosphate solution is separated from solid matter, the pressure being maintained.

9 Claims, No Drawings

PRODUCTION OF ALKALI METAL PHOSPHATE SOLUTIONS FREE FROM ZINC

This invention relates to a process for making alkali metal phosphate solutions free of zinc, from phosphoric acid solutions contaminated with zinc, especially from wet-processed phosphoric acid solutions or from alkali metal phosphate solutions having contaminants originating from crude wet-processed phosphoric acid at least partially precipitated therein.

In industry, alkali metal phosphates are chiefly made into condensed phosphates, especially pentasodium triphosphate, which is an important ingredient of almost all current detergent compositions. These are alkali metal phosphates which are often made by neutralizing a wet-processed phosphoric acid obtained by subjecting crude phosphates to wet-processing treatment with mineral acid. This gives crude phosphoric acid which is normally contaminated with relatively high proportions of iron, aluminium, magnesium and zinc salts, and can be subjected to a single or multi-stage neutralization with the use of an alkali metal hydroxide or carbonate. By the neutralization just described, which is often allowed to proceed to the dialkali hydrogen phosphate stage, it is, however, not possible reliably to remove zinc, and the resulting phosphate salt solutions contain indeed up to 600 ppm of zinc (based on $P_2O_5$), depending on the quality of the crude acid used in each particular case.

It has been described that metallic contaminants, and especially zinc are liable to impair certain properties of sodium tripolyphosphate, e.g. its hydration behaviour.

All processes described heretofore for the removal, by precipitation, of metallic contaminants from wet-processed phosphoric acid comprise subjecting phosphoric acid which is to undergo purification to treatment with hydrogen sulfide or a sulfide solution in an acid medium, if desired, and then neutralizing it by means of an alkali, and separating precipitated contaminants therefrom.

Canadian Pat. No. 380,394, of which U.S. Pat. No. 2,162,657 is a counterpart, for example describes a process wherein phosphoric acid is partially neutralized to a stage where less than 50% of sodium dihydrogen phosphate has undergone conversion to disodium hydrogen phosphate (pH 6.5) and then treated with hydrogen sulfide or an alkali metal sulfide to cause precipitation of contaminants originating from wet-processed phosphoric acid.

As can be inferred from Example 1 of that Patent, about 1.5 kg of $Na_2S$ is required to be used per 100 kg of $P_2O_5$. Despite this, the contaminants are removed incompletely only. This results from the 0.167% overall concentration of contaminants determined after neutralization and precipitation with sulfide. In other words, complete precipitation of contaminants would necessitate the use of considerably more $H_2S$ or $Na_2S$.

In this prior process, relatively expensive $H_2S$ or $Na_2S$ is not exclusively used for precipitating ZnS. It is also used for separating iron normally contained in phosphoric acid in proportions 5 to 20 times as large as the proportion of zinc therein. As can be seen, the process just described would not permit zinc to be separated quantitatively under commercially attractive conditions. In addition to this, it is necessary in the process just described, first to cool the suspension which is to undergo neutralization and then to add the precipitant in order to avoid heavy loss of $H_2S$ volatile at elevated temperature. This however is expensive in respect of machinery and has adverse effects on the filterability of the suspension.

A series of further processes have been described in U.S. Pat. No. 2,977,191, South African Pat. Nos. 69/5253 and 69/8290, and U.S. Pat. Nos. 3,305,305 and 3,421,845. These are processes which relate to the removal of metallic impurities, such as manganese or vanadium, from phosphoric acid solutions, and which are based on principles analogous to those described in U.S. Pat. No. 2,162,657.

More specifically, processes are concerned which provide for the sulfide compound to be added to a more or less acidic feed solution, the sulfide compound being used as a medium effecting the precipitation of relatively large proportions of iron, and also the reduction of those metal ions which are present in a higher stage of oxidation. Zinc is not removed, or to an insignificant extent only, in the process just described.

A method widely used in analytical chemistry for removing zinc from an aqueous solution comprises precipitating the zinc with $H_2S$ or $Na_2S$ in a slightly acidic or alkaline medium, the precipitation of zinc from a slightly acidic solution being generally preferred because of the poor filterability of matter which is precipitated from an alkaline solution.

It is therefore highly desirable to have a commercially attractive and simple process for making alkali metal phosphate solutions free of zinc, from zinc-containing phosphoric acid or alkali metal phosphate solutions.

The present invention now unexpectedly provides a process for making alkali metal phosphate solutions free of zinc, from phosphoric acid solutions contaminated with zinc and more especially from wet-processed phosphoric acid solutions or alkali metal phosphate solutions having contaminants originating from wet-processed phosphoric acid at least partially precipitated therein, which comprises:

(a) admixing the solution with alkali metal hydroxide or carbonate so as to establish in the resulting suspension a pH-value within the range 8 to 14, preferably 9 to 9.5, (b) reacting the suspension under pressure and with thorough agitation with $H_2S$ or an alkali metal sulfide solution; and (c) separating decontaminated alkali metal phosphate solution from all solid matter, the pressure being maintained.

A preferred feature of the present invention provides for hydrogen sulfide or alkali metal sulfide, especially sodium sulfide, to be used in a proportion of 150 to 300 mol %, based on the zinc present in the feed solution. It is also preferable in accordance with this invention to react the suspension with hydrogen sulfide or alkali metal sulfide solution under a pressure of 0.1 to 10 bars and to separate solid matter from the alkali metal phosphate solution with the use of a pressure filter under approximately the same pressure. A further preferred feature of the present invention provides for hydrogen sulfide or alkali metal sulfide solution to be introduced directly into a pump, or directly upstream thereof, the pump forming part of a pressure filter being positioned directly ahead of the filter.

The present process offers technically beneficial effects in respect of the following points:

(1) It enables zinc to be precipitated and separated practically quantitatively, in sulfide form. The precipitant (commonly $Na_2S$ or $H_2S$) is used in proportions of 150 to 300 mol %, based on zinc in the solution, and gives filtrate containing less than 5 ppm of zinc.

(2) It ensures optimum utilization of precipitant for precipitation of ZnS (no co-precipitation of FeS, no loss of $H_2S$ by escape of readily volatile hydrogen sulfide via gas phase) and naturally low consumption of precipitant.

(3) Additional machinery and investment of capital are not necessary. The process can be carried out with the use of apparatus of the kind commonly used for decontaminating wet-processed phosphoric acid.

The fact that the present process permits zinc sulfide to be precipitated quantitatively within the short period of time during which the suspension is passed through the filter, namely 3 to 5 minutes, depending on the filling volume of the filter, is a very unexpected result as is also the good filterability of zinc sulfide precipitated in an alkaline medium.

Even in those cases in which use was made of a suspension in which about 20% of the solid matter was zinc sulfide, the filtration capacity was not affected or to an insignificant extent only.

The following Examples illustrate the invention.

EXAMPLE 1

Wet-processed phosphoric acid (25.3% $P_2O_5$; 0.15% $Fe_2O_3$; 0.13% $Al_2O_3$; 0.03% Zn) made from Morocco phosphate was used. 30 $m^3/h$ of acid was subjected to single-stage neutralization with sodium hydroxide solution and neutralized to give $Na_2HPO_4$ (pH=9). The suspension which was so obtained was filtered using two identical filtration units (1A and 1B, respectively) of which each was comprised of a horizontal pressure filter (70 $m^2$ filter area) and a circulating pump (Q=up to 100 $m^3/h$). Filtration unit 1A was operated without addition of $Na_2S$ to suspension. Suspension delivered to filtration unit 1B was admixed, directly upstream of the circulating pump, with 8 $l/m^3$ of a 12% $Na_2S$-solution (0.4% $Na_2S/P_2O_5$; this corresponded to 250 mol %, based on Zn), intimately mixed therewith at a pressure of about 7 bars, and filtered. Each of the 1A and 1B units had a filtration capacity of 0.2 $m^3/h.m^2$, under pressure of 7 bars. Clear diphosphate filtrates were obtained in the two cases. In case 1A (no sulfide precipitation), the filtrate contained 110 ppm of zinc and in case 1B (with sulfide precipitation), the filtrate contained less than 5 ppm of zinc.

EXAMPLE 2

The procedure was as described in Example 1B, but $Na_2S$-solution was introduced into a reservoir containing the suspension to undergo neutralization. After sulfide addition, the suspension was allowed to remain in the reservoir for an average period of 2 hours at 90° C. and then filtered. 80 l of a 12% $Na_2S$-solution (4% $Na_2S/P_2O_5$) was used per $m^3$ of suspension. The filtered disodium phosphate solution was found to contain 30 ppm of zinc. As a result of the 2 hour sojourn time of the suspension in the reservoir, the filtrate contained 6 times more Zn than the filtrate of Example 1B, despite the use of a 10 times larger proportion of $Na_2S$ in the present Example.

EXAMPLE 3

Wet-processed phosphoric acid, the same as that used in Example 1, was treated with sodium hydroxide solution and neutralized initially to the monophosphate stage (pH=4.5). Resulting zinc-containing precipitate was filtered off. $NaH_2PO_4$-solution was obtained as the filtrate. It contained 190 ppm of zinc and was neutralized in a second stage to diphosphate (pH=9). As in Example 1, filtration unit 3A was operated without $Na_2S$-addition to suspension. Suspension delivered to filtration unit 3B (3A and 3B units provided with filter and pump same as in Example 1B) was admixed, inside unit 3B, directly upstream of circulating pump, with 250 mol % (based on zinc content of monophosphate solution which was 0.3% $Na_2S/P_2O_5$) of an aqueous $Na_2S$-solution, and suspension and solution were mixed together under a pressure of about 7 bars. Unit 3A operated without $Na_2S$-addition had a filtration capacity of 0.24 $m^3/h^{-1}.m^{-2}$ and gave a disodium phosphate solution which contained 90 ppm of zinc. Unit 3B operated with sulfide precipitation had a slightly reduced filtration capacity of 0.22 $m^3/h^{-1}.m^{-2}$ but gave filtrate containing less than 5 ppm of zinc. Comparison with Example 1B shows that it is possible for less sulfide to be used provided that neutralization is effected in two stages and that precipitate formed in first neutralization stage is removed.

EXAMPLE 4

The procedure was as in Example 3B. Wet-processed phosphoric acid was neutralized to monophosphate stage, but $NaH_2PO_4$-solution obtained after filtration (21% $P_2O_5$; 190 ppm zinc; 160 ppm iron) was neutralized to diphosphate content of 46% only (pH=6.5). Prior to separating precipitated matter, suspension was admixed with 0.8% $Na_2S/P_2O_5$, which was used in the form of a 12% $Na_2S$-solution and introduced upstream of a feed pump forming part of a pressure filter. Suspension and solution were mixed together under a pressure of about 4 bars. The resulting clear filtrate still contained 35 ppm of zinc. This indicated that zinc was not satisfactorily removed within pH-range disclosed, e.g. in Canadian Patent 380,394, even with use of increased quantity of $Na_2S$.

EXAMPLE 5

Wet-processed phosphoric acid made from North African phosphate was subjected to two-stage neutralization at pH of 9. This gave decontaminated disodium phosphate solution which still contained 420 ppm of zinc, based on $P_2O_5$, as well as material which consisted essentially of magnesium phosphates post-precipitated after storage for some prolonged time. Prior to making the solution into sodium triphosphate, zinc was precipitated therefrom in the form of zinc sulfide which was filtered off together with the magnesium salts. To this end, 3.9 l of a 10% $Na_2S$-solution (0.17% $Na_2S/P_2O_5$) was added per $m^3$ of suspension, immediately upstream of circulating pump forming part of pressure filter. 300 mol % of sulfide, based on Zn, was used. Solution and suspension were mixed together under a pressure of 9 bars. Filtration was effected under approximately the same pressure with filtration capacity of 0.4 $m^3/h.m^2$. A clear disodium phosphate solution containing less than 1 ppm of zinc was obtained.

It is possible for the phosphate solution to be admixed prior to sulfide precipitation, with a filtration aid, e.g.

active carbon, so as to improve filtration properties in the presence of minor or complete absence of post-precipitated matter.

We claim:

1. In the process for making alkali metal phosphate solutions from phosphoric acid solutions contaminated with zinc, the improvement which comprises:
   (a) admixing the phosphoric acid solution with alkali metal hydroxide or carbonate so as to establish in the resulting mixture a pH-value within the range 8 to 14,
   (b) reacting the mixture with $H_2S$ or an alkali metal sulfide solution under a gauge pressure within the range 0.1 to 10 bars and with thorough agitation, and
   (c) separating solid matter from the liquid phase of the resulting suspension while maintaining said pressure until the separation step is completed, with the resulting formation of an alkali metal phosphate solution substantially free from zinc contamination.

2. The process as claimed in claim 1, wherein the precipitate is separated from the alkali metal phosphate solution with a pressure filter.

3. The process as claimed in claim 2, wherein a solution of the sulfide is introduced directly into a pump, or directly upstream thereof, the pump forming part of, and being positioned ahead of, the pressure filter.

4. The process as claimed in claim 1, wherein the pH is within the range 9 to 9.5.

5. The process as claimed in claim 1, wherein the sulfide is used in a proportion within the range 150 to 300 mol %, based on the zinc in the contaminated solution.

6. The process as claimed in claim 1, wherein the sulfide is $Na_2S$.

7. The process as claimed in claim 1, wherein the contaminated solution is a wet-process phosphoric acid solution, and it is reacted with the alkali metal hydroxide or carbonate in two stages, the first bringing the solution to a pH of about 4.5 after which the precipitate thus formed is separated and the remaining solution then further reacted with the alkali metal hydroxide or carbonate to bring it to a pH of about 9.

8. The process as claimed in claim 1, wherein the separation is effected promptly after the agitation.

9. The process for preparing a purified aqueous alkali metal phosphate solution from a zinc-contaminated acid solution of a phosphate, the improvement which comprises:
   (a) admixing the contaminated acid solution with alkali metal hydroxide or carbonate to bring the pH of the mixture within the range of 8 to 14,
   (b) reacting that mixture with hydrogen sulfide or an alkali metal sulfide under a gauge pressure within the range of 0.1 to 10 bars and with thorough agitation, the proportion of sulfide being from 150 to 300 mol % of that needed to precipitate all the zinc, and
   (c) separating the precipitate from the sulfide-reacted mixture while maintaining said pressure, to yield a solution substantially free from zinc contamination.

* * * * *